(12) United States Patent
Millett

(10) Patent No.: US 7,365,924 B1
(45) Date of Patent: Apr. 29, 2008

(54) SIGHT TUBE PIVOT ASSEMBLY

(75) Inventor: James A. Millett, Huntington Beach, CA (US)

(73) Assignee: Millett Industries, Inc., Huntington Beach, CA (US)

( * ) Notice: Subject to any disclaimer, the term of this patent is extended or adjusted under 35 U.S.C. 154(b) by 76 days.

(21) Appl. No.: 11/295,810

(22) Filed: Dec. 8, 2005

(51) Int. Cl.
*G02B 7/02* (2006.01)
*G02B 7/00* (2006.01)
*G02B 23/00* (2006.01)
*F41F 1/00* (2006.01)
*F41G 1/38* (2006.01)

(52) U.S. Cl. .................. 359/822; 359/823; 359/399; 359/506; 42/122; 42/126; 124/27; 89/37.05; 89/37.16; 89/41.19; 279/6; 279/133

(58) Field of Classification Search ............... 359/811, 359/819, 822, 823, 506, 384, 399; 33/272, 33/285, 339, 351, 352, 354, 383; 89/37.05, 89/37.16, 41.19, 200; 116/292; 42/122, 42/126; 279/6, 133; 124/27, 37
See application file for complete search history.

(56) References Cited

U.S. PATENT DOCUMENTS

| | | | | | |
|---|---|---|---|---|---|
| 2,965,002 | A | * | 12/1960 | Musser et al. | 89/41.19 |
| 3,429,636 | A | * | 2/1969 | Wentz | 359/259 |
| 3,544,117 | A | * | 12/1970 | Bingham | 279/6 |
| 3,841,647 | A | * | 10/1974 | Cooper | 279/110 |
| 4,286,388 | A | * | 9/1981 | Ross et al. | 42/122 |
| 4,297,789 | A | * | 11/1981 | Tominaga | 33/298 |
| 4,660,458 | A | * | 4/1987 | von Laar et al. | 89/25 |
| 4,665,885 | A | * | 5/1987 | Glomski et al. | 124/27 |
| 5,441,284 | A | * | 8/1995 | Mueller et al. | 279/2.02 |
| 6,005,711 | A | * | 12/1999 | Mai et al. | 359/424 |
| 6,286,411 | B1 | * | 9/2001 | Sanderson | 89/37.16 |
| 6,972,910 | B2 | * | 12/2005 | Orimo et al. | 359/694 |

* cited by examiner

*Primary Examiner*—Loha Ben
(74) *Attorney, Agent, or Firm*—G. Donald Weber, Jr.

(57) ABSTRACT

An improved aiming tube pivot assembly for use in a sighting and/or aiming apparatus which comprises an aiming tube axially mounted within an outer tube (or housing). A support ring supports the aiming tube within the outer tube in a gimbal-like arrangement by means of ball bearings and set screws. The ball bearings are secured intermediate the aiming tube and the support ring via apertures in the outer tube. The set screws are threaddly mounted in the support ring and engage the outer surface of the outer tube. A movable cover tube can be mounted on the outer tube and substantially encloses the end of the outer tube and the support ring.

20 Claims, 4 Drawing Sheets

SIGHT TUBE PIVOT ASSEMBLY

BACKGROUND OF THE INVENTION

1. Field of the Invention

This invention is directed to an aiming and/or sighting device, in general, and to an improved pivot assembly for use with such devices, in particular.

2. Prior Art

Currently, most aiming and/or sighting devices, particularly those used with rifles, or other hand held weapons (and the like) include an adjustment apparatus for adjusting the device to compensate for windage and/or elevation.

The known apparatus, typically, includes a type of ball joint between the outer housing or tube of the mechanism and the internal aiming tube. This ball joint includes spherical surfaces at the aiming tube and the adjustment mounting. These complementary spherical surfaces interface at a very small portion of each surface which requires high tolerance processing which is expensive and difficult to manufacture. In addition, these small surface portions can readily become out of alignment during use.

Typically, these surfaces are fabricated of a hard material, such as aluminum or steel, which requires much machining and extremely close tolerances. Thus, this joint is quite expensive to produce.

In addition, the typical joint requires high tolerance clamps, washers and springs to maintain the integrity thereof. However, it has been found that after a relatively small number of firings of the attached weapon, the adjustment joint in the aiming/sighting apparatus becomes loose and, thus, inaccurate.

Thus, a new and improved aiming apparatus and manufacturing technique is required.

SUMMARY OF THE INSTANT INVENTION

An improved aiming tube pivot assembly or apparatus for use in a sighting and/or aiming apparatus comprises an aiming tube axially mounted within an outer tube (or housing). A support ring encircles the outer tube and supports the aiming tube within the outer tube in a gimbal-like arrangement by means of ball bearings and set screws. The ball bearings are positioned intermediate the aiming tube and the support ring. The ball bearings engage apertures in the support ring and cavities in the aiming tube via openings in the outer tube. The set screws are threadedly mounted in the support ring and engage the outer surface of the outer tube. A movable cover tube is mounted on the outer tube and substantially encloses the end of the outer tube and the support ring.

DESCRIPTION OF A PREFERRED EMBODIMENT

Figure 1:
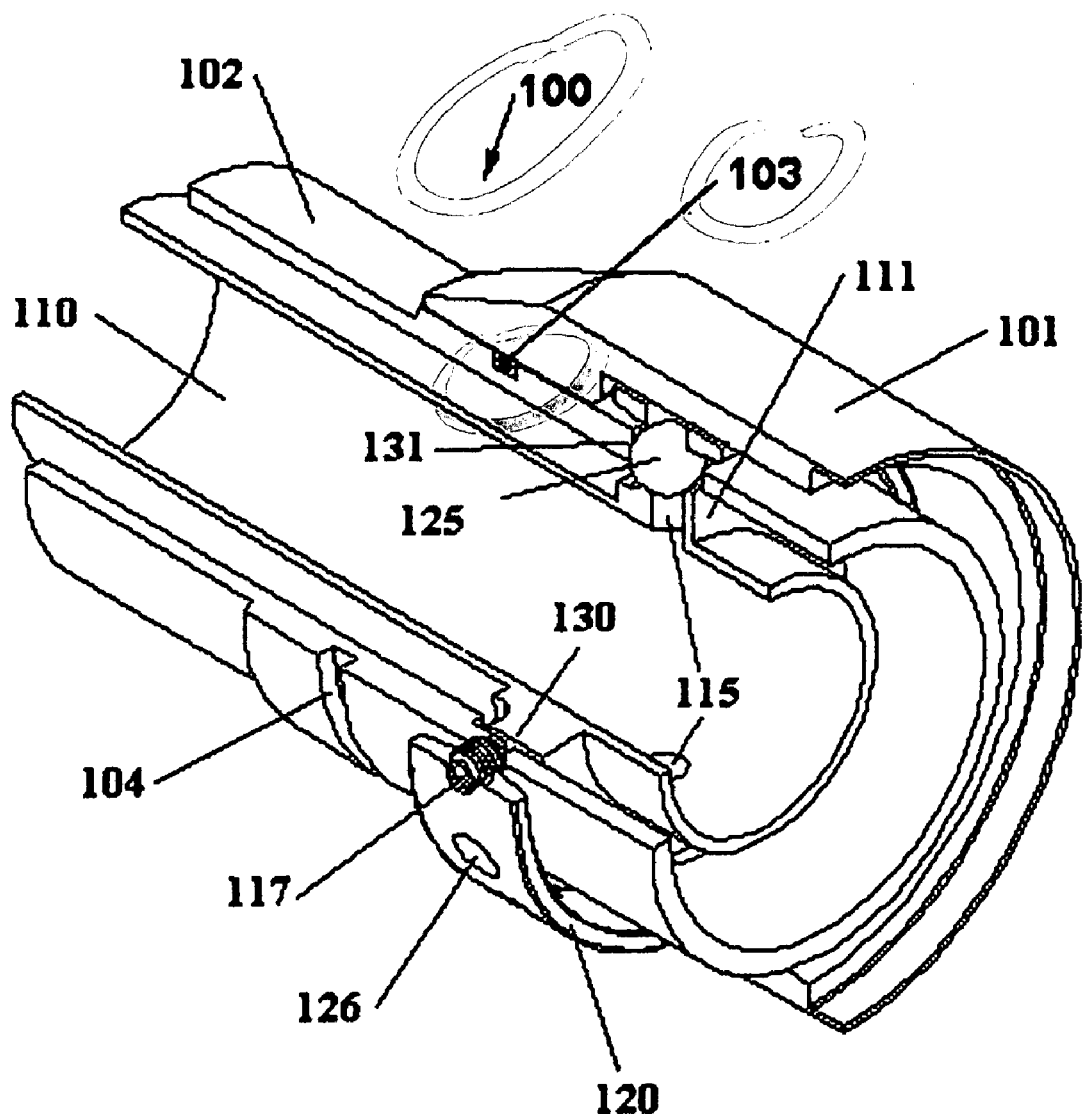
FIG. 1 is a perspective view of a sighting apparatus with a partially broken away cover tube showing the pivot assembly of the instant invention.

Referring concurrently to FIGS. 1 through 4, there is shown a preferred embodiment of the instant invention. The perspective view of the sighting or aiming assembly 100 shown in FIG. 1 includes a partially broken away cover tube 101. The cover tube 101 is a conventional tube, typically fabricated of steel or aluminum, and is not part of the invention, per se. The cover tube 101 is shown for completeness in understanding the environment of the invention described hereinafter.

The outer tube 102 of the sighting assembly or housing is, typically, fabricated of steel or aluminum, as is conventional, and can be assembled to include glass, lenses or any other features, as desired. The cover tube 101 is adapted to engage the end portion of outer tube 102 by a friction fit. A suitable O-ring 103 can be installed in groove 104, if desired, in order to seal the end of the apparatus. In some cases, the end portion of outer tube 102 may be stepped to have a somewhat larger inner diameter than the main body of the outer tube.

Aiming tube 110 is, typically, fabricated of steel or aluminum as is conventional. The aiming tube 110 is a cylindrical tube which is axially disposed within the outer tube 102. The outer diameter of aiming tube 110 is smaller than the inner diameter of outer tube 102 to permit relative movement of the outer tube 102 and the aiming tube 110. Aiming tube 110 can include any type of optical arrangement desired in the sighting or aiming assembly 100.

Figure 2:
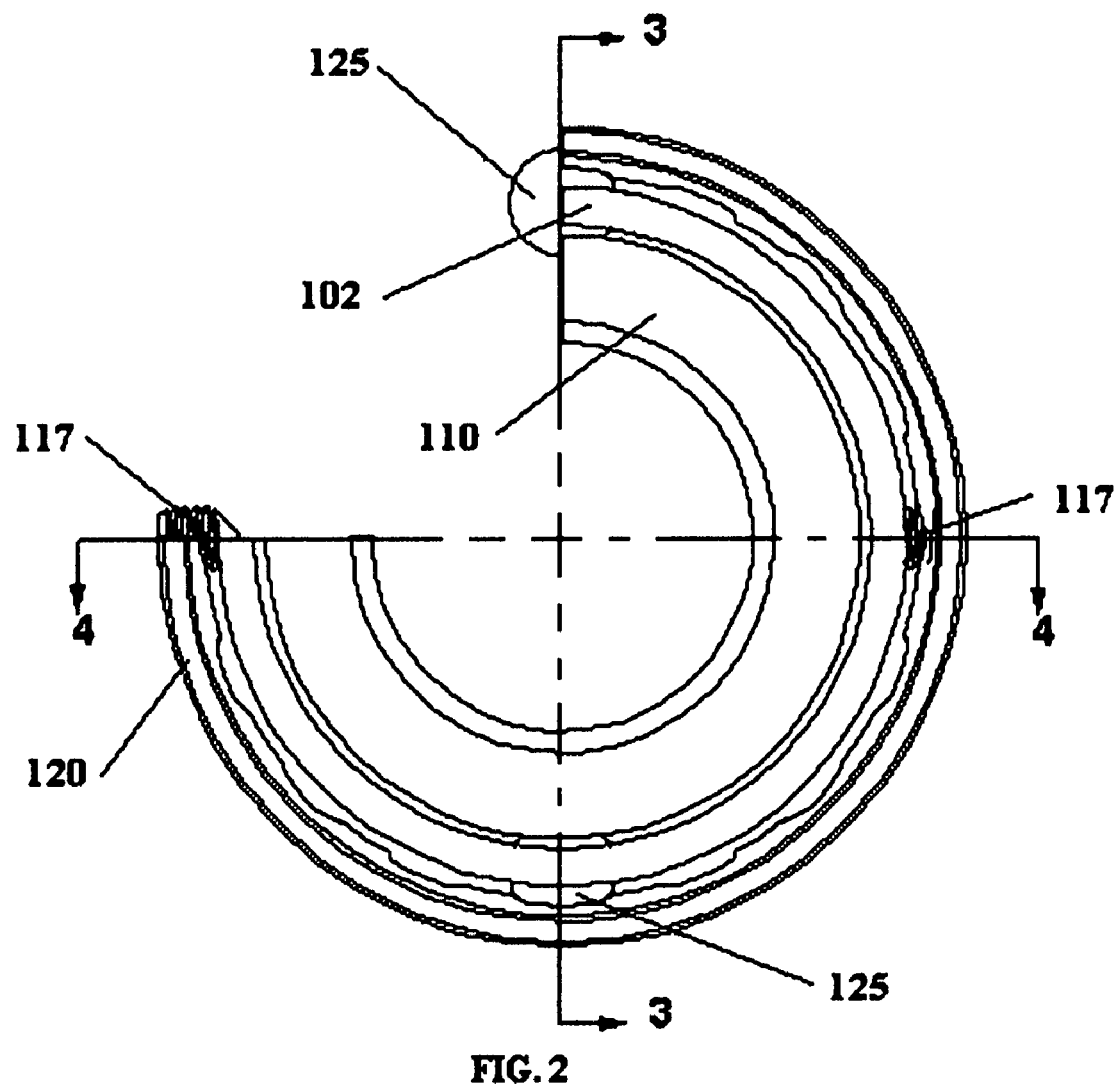
FIG. 2 is a partially broken away end view of the pivot assembly of the instant invention.
Figure 3:
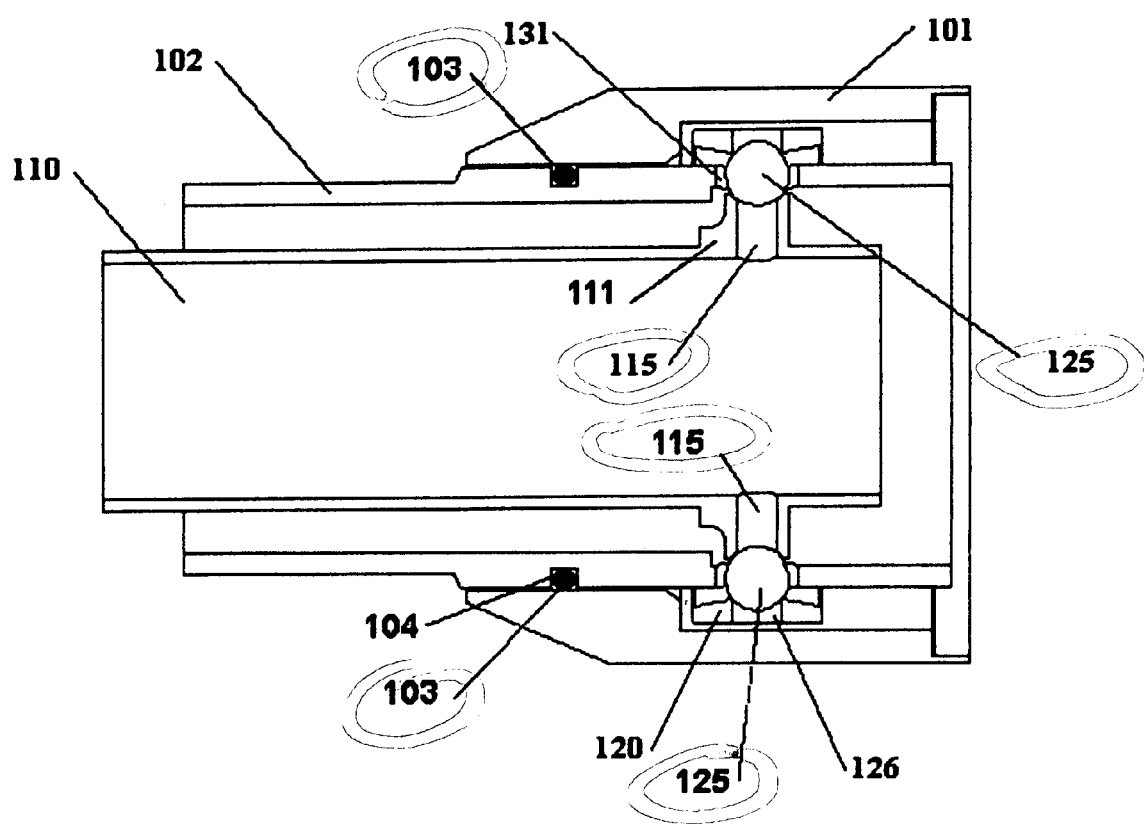
FIG. 3 is a partially broken away side view of the sighting apparatus with the pivot assembly of the instant invention taken along the lines 3-3 of FIG. 2.
Figure 4:
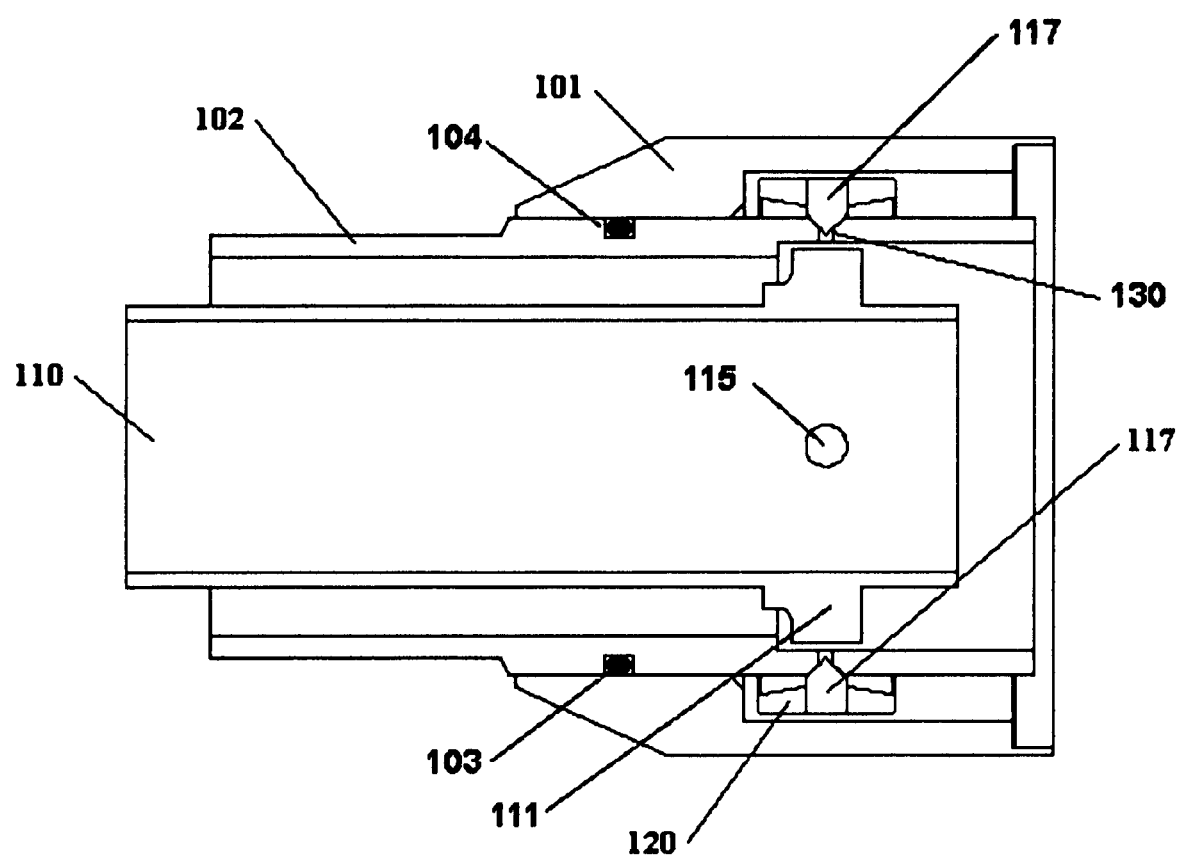
FIG. 4 is a partially broken away side view of the sighting apparatus with the pivot assembly of the instant invention taken along the lines 4-4 of FIG. 2.

The aiming tube 110 includes an external collar 111 integrally formed therewith or securely attached thereto adjacent to the end of aiming tube 110. The outer diameter of collar 111 is nearly the same as the inner diameter of the housing 102 as seen in FIGS. 2, 3 and 4. Typically, a small clearance is provided between the outer surface of collar 111 and the inner surface of housing 102 to permit aiming tube 110 to move slightly within the end of housing tube 102, as described infra. A pair of diametrically opposed cavities 115 are formed in, and, possibly, through, the outer surface of the collar 111. An optional pair of recesses 130 are formed in the outer surface of outer tube 102. The shape and dimensions of the cavities 115 and recesses 130 are not crucial to the invention, per se.

A band 120, typically formed of hardened spring steel or the like, encircles and is spaced slightly away from the outer surface of outer housing tube 102 as well as the inner surface of cover tube 101. While not absolutely essential, the band 120 is slightly thicker at the middle thereof. The band 120 includes a plurality of apertures 126 (See FIGS. 1 and 3) therethrough which apertures cause the band to exhibit sufficient flexibility to take a uniform ring-shape especially during manufacturing.

Two of the apertures, which are diametrically opposed to each other in the band 120 are threaded to receive set screws 117 therethrough. Preferably, the screws 117 have conical interior ends which securely engage the outer surface of the outer housing tube 102 as seen in FIGS. 1, 2 and 4. Small recesses 130 or apertures can be provided in the outer surface of the outer housing 102. Thus, the spring band 120 is, to a large degree, fixed relative to the outer housing tube 102.

When assembled, the aiming tube 110 is axially placed within the outer housing 102. A pair of spheres 125, such as ball bearings or the like, are placed in diametrically opposed apertures through outer tube 102 intermediate the band 120 and the seating cavities 115 formed in (or through) the outer surface of collar 111 of aiming tube 110 as seen best in FIGS. 1 and 3. The spheres 125 are disposed to engage the inner edges of two apertures 131 which extend through the band 120. The inner edges of these apertures may be chamfered, if so desired, to ensure the seating of the spheres 125 therein.

It is noted that apertures 131 of the band 120 are diametrically opposed to each other and orthogonally disposed relative to recesses 130 in the outer housing 102.

Thus, the ball bearings 125 are captured in the apertures 131 in the spring band 120 between the spring band 120 and the cavities 115 in collar 111. This arrangement permits aiming tube 110 to pivot around the axis formed by the collar 111 and the ball bearings 125.

The pair of set screws 117 are then threadedly engaged with the diametrically opposed apertures through spring band 120 until the interior ends thereof (typically conical in shape) are seated against the outer surface of outer housing 102 (or recesses 130 therein as seen in FIG. 4) to securely fasten the spring band 120 to the housing 102 to prevent axial movement of the sighting tube 110 relative to the outer housing 102.

This arrangement of components permits windage and elevation adjustment of the sighting or aiming tube 110 within the outer housing 102 in a fashion which is not readily dislodged or dislocated as in the prior art. That is, the aiming tube 110 can pivot around the mounting set screws 117 to adjust for elevation and, as well, pivot around the mounting spheres 125 to adjust for windage. Moreover, when the set screws 117 are tightened, the spring tension applied to spring band 120 compensates for any wear which may occur at the mating surfaces of the apparatus.

Thus, there is shown and described a sight tube pivot assembly. While this description is directed to particular embodiments, it is understood that those skilled in the art may conceive modifications and/or variations to the specific embodiments shown and described herein. Any such modifications or variations which within the purview of this description are intended to be included therein as well. It is understood that the description herein is intended to be illustrative only and is not intended to be limitative. Rather, the scope of the invention described herein is limited only by the claims appended hereto.

The invention claimed is:

1. A pivot apparatus comprising,
a first tube having a plurality of tube apertures therethrough,
a second tube arranged coaxially within said first tube,
a band circumscribing said first tube,
a plurality of pivot means respectively interposed between said second tube and said band through said tube apertures in said first tube, and
a plurality of mounting means respectively interposed between said band and said first tube to secure said band to said first tube.

2. The apparatus recited in claim 1 wherein,
said band includes a plurality of band apertures therethrough for retaining each of said plurality of pivot means and each of said plurality of mounting means.

3. The apparatus recited in claim 2 wherein,
said band includes further band apertures in addition to said plurality of band apertures for retaining said plurality of pivot means and said plurality of mounting means.

4. The apparatus recited in claim 2 including,
further band apertures in said band disposed intermediate said plurality of band apertures for retaining said pivot means.

5. The apparatus recited in claim 1 wherein,
said first tube and said second tube form a sighting device.

6. The apparatus recited in claim 1 including,
an outer covering which encircles at least a portion of said first tube and said band mounted thereto.

7. The apparatus recited in claim 6 including,
sealing means interposed between said outer covering and said first tube.

8. The apparatus recited in claim 1 wherein,
said mounting means comprise screws which are threadedly engaged with said band.

9. The apparatus recited in claim 1 wherein,
said plurality of pivot means comprise spheres which are mounted in said band.

10. The apparatus recited in claim 1 wherein,
said band comprises a ring formed of spring steel.

11. The apparatus recited in claim 1 wherein,
at least one of said first and second tubes is fabricated of metal.

12. The apparatus recited in claim 1 wherein,
at least one of said first and second tubes is adapted to receive and retain a lens means.

13. The apparatus recited in claim 1 including,
collar means formed around a portion of said second tube so as to engage said plurality of first pivot means.

14. The apparatus recited in claim 13 wherein,
said collar means includes a plurality of recesses to receive at lease a portion of each of said plurality of pivot means.

15. A pivot assembly comprising,
a first tube having a plurality of tube apertures therethrough,
a second tube arranged coaxially within said first tube,
a support band circumscribing said first tube,
said support band includes a plurality of band apertures therethrough,
a plurality of pivot means interposed between said second tube and said support band through said tube apertures in said first tube,
said pivot means comprise spheres which are mounted in band apertures in said support band, and
said securing means comprise screws threadedly engaged with said band,
at least one securing means mounted in said band to secure said band to said first tube.

16. The apparatus recited in claim 15 including,
collar means formed around a portion of said second tube so as to engage said plurality of pivot means.

17. The apparatus recited in claim 16 wherein,
said collar means includes a plurality of recesses to at least receive a portion of each of said plurality of pivot means.

18. The apparatus recited in claim 15 wherein,
said first tube and said second tube form a sighting device.

19. The apparatus recited in claim 15 including,
an outer covering which encircles at least a portion of said first tube and said support band mounted thereto.

20. The apparatus recited in claim 15 wherein,
said band comprises a ring formed of spring steel.

* * * * *